United States Patent Office 3,322,793
Patented May 30, 1967

3,322,793
FERROCENE, MALEIC ANHYDRIDE, CYCLIC ETHER ADDUCTS
Richard E. Bozak, Walnut Creek, Calif., assignor to Shell Oil Company, New York, N.Y., a corporation of Delaware
No Drawing. Filed Apr. 9, 1964, Ser. No. 358,640
2 Claims. (Cl. 260—340.6)

ABSTRACT OF THE DISCLOSURE

Adducts of ferrocene, maleic anhydride, and cyclic ethers, having use as hydrocarbon inks, combustion modifiers, anti-corrosion agents, pesticides and fungicides.

---

Since its discovery in 1951, dicyclopentadienyl iron (ferrocene) and its derivatives have become increasingly important in many aspects both theoretically and practical. Ferrocene and derivatives thereof have been found to be useful as antiknock agents in gasoline compositions, as fungicides and pesticides, and as intermediates in preparing a number of iron containing organic compounds. However, relatively few functional derivatives of ferrocene have been disclosed with the result that only a limited number of useful derivatives and compositions containing them have been prepared. Ferrocene itself is soluble in most organic solvents while being insoluble in water and is quite stable to acids and bases. Additionally ferrocene does not readily oxidize and is relatively stable to heat and light and thus a compound containing a ferrocene moiety possesses many desirable characteristics not commonly associated with other iron containing compositions.

The object of the present invention is to provide a new class of ferrocene compounds and method of preparing them.

Now, in accordance with this invention, there is provided a new class of compounds represented by the formula:

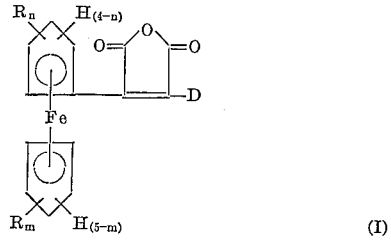

where each R is independently selected from the group consisting of alkyl, aryl, alkaryl, aralkyl, alkoxy, amino, and aminoalkyl having from 1–8 carbon atoms; $n$ is an integer of from 0 to 4 and is preferably 0 or 1; $m$ is an integer of from 0 to 5 and is preferably 0 or 1; D is an oxa- and/or thia-cycloalkanyl of 5 to 6 ring atoms with no more than two non-carbon ring atoms and no adjacent non-carbon ring atoms, with the total C-atoms in the radical being from 4 to 20, especially such a radical selected from the group consisting of:

(1), (2) and (3)

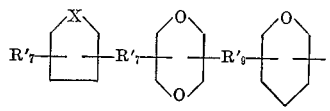

where X is a chalcogen having at atomic number from 8 to 16, i.e. oxygen or sulfur; each R′ is selected from the group consisting of hydrogen and a lower alkyl group of from 1 to 4 carbon atoms; hydrogen is preferred.

The novel compounds of this invention are prepared by reacting (a) ferrocene or a substituted derivative thereof, (b) maleic anhydride and (c) tetrahydrofuran and lower alkyl substituted derivatives, tetrahydrothiophene and lower alkyl substituted derivatives, dioxane, tetrahydropyran, and the like in the presence of a free radical initiator.

The ferrocene used in the preparation of the compound of this invention is of the formula:

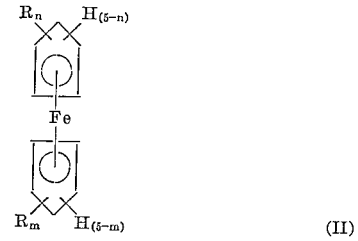

where the letters and symbols have the same significances as in Formula (I) and represents a group selected from the group consisting of alkyl, aryl, alkaryl, aralkyl, alkoxy, and amino alkyl. When R is an aryl radical it may be fused with the cyclopentadienyl group, for example, resulting in an indenyl iron compound such as that shown in U.S. Patent No. 3,013,040.

The ferrocene may be obtained by a number of processes such as for example reacting a cyclopentadienyl-magnesium halide with anhydrous ferric chloride as disclosed by Kealy and Pauson, "Nature," vol. 168, page 1039 (1951) or by reacting cyclopentadiene and reduced iron in nitrogen at 300° as shown by Miller et al., "Journal of the Chemical Society," page 632 (February 1952). A number of U.S. patents which disclose other methods of preparing dicyclopentadienyl iron or substituted derivatives are 2,834,796, 2,796,828, 2,804,468, 2,817,674, and 2,898,360. Any suitable and convenient method may be used.

The oxa- or thiacycloalkane reactant is a saturated heterocyclic compound having 4 or 5 ring carbon atoms and no more than two hetero-atoms which are oxygen and/or sulfur and containing only C and H atoms and the ring chalcogen atoms. Oxygen is preferred. Compounds which may be used comprise tetrahydrothiophene, tetrahydrofuran, dioxane, tetrahydropyran and lower alkyl substituted derivatives thereof. Some specific examples of useful materials are tetrahydrofuran, tetrahydro-2-methylfuran, tetrahydrothiophene, 1,4-dioxane, 1,3-dioxane and tetrahydropyran. Tetrahydrofuran is preferred.

The reaction between the ferrocene, maleic anhydride and the heterocyclic compound to prepare the novel compound of the invention is carried out in the presence of a catalyst. A suitable catalyst is one which will act as a free radical initiator in the reaction. Some catalysts which may be used are hydrogen peroxide, organic peroxides such as, acetyl peroxide, di-tert-butylperoxide, tert-butyl hydroxyperoxide, lauroyl peroxide, ascaridole (menthane peroxide from wormseed oil) and azo compounds such as azobisisobutyronitrile, etc. The amount of catalyst to be used is not critical and may be present in trace amounts or greater. Amounts up to for example four times or more of the mole percent of maleic anhydride may be used.

The reaction takes place under ambient conditions of temperature and pressure although higher temperatures may be used. Preferably the reaction will be conducted between about 5° C. and about 150° C. The reaction proceeds well at room temperature (20°–30° C.). In practice the reaction temperature may be any temperature up to the boiling point of one of the reactants where no external pressure is applied. Atmospheric pressure may be used thus avoiding the necessity of using superatmospheric pressure. However, higher or lower pressures may be used when the temperature is adjusted to avoid vaporization of the reactants.

The proportions of reactants used to prepare the novel compound are not critical. The stoichiometric proportions of ferrocene, maleic anhydride and heterocyclic compound are 1:1:1, respectively, and may be used. However, the relative proportions may be varied greatly and are not particularly critical. It has been found that where ferrocene is present in an excess of up to 200% over the stoichiometric amount relative to the maleic anhydride the yield is improved.

No solvent medium is generally necessary for the reaction. The heterocyclic compound to be used in the reaction with ferrocene and maleic anhydride (tetrahydrofuran, dioxane, etc.), which is liquid at reaction temperature will act as a solvent for the ferrocene and the maleic anhydride, and may be used in excess to provide solvent throughout the reaction.

*Example I*

0.5 gram (5.1 mmoles) of maleic anhydride and 2.0 grams (10.7 mmoles) of ferrocene were dissolved in 100 cc. of tetrahydrofuran and 3 cc. of a 30% aqueous solution of hydrogen peroxide was added. The solution was allow to stand for about 60 hours and then anhydrous magnesium sulfate was added. The mixture was filtered and evaporated to dryness. The remaining product was dissolved in about 40 cc. of benzene. The solution was a deep blue color. The deep blue solution was run through a column containing a non-activated silica gel in petroleum ether. The blue solution (which was a blue band within the column) was then drawn off and evaporated to dryness, The resulting solid was then recrystallized from hexane solution.

The recrystallized compound (deep blue needles) had a melting point of 138–139.2° C. The actual analysis of the compounds was percent C=61.4; percent H=4.6; percent Fe=15.4. The theoretical analysis of $C_{18}H_{16}O_4Fe$, is percent C=61.4; percent H=4.6; percent Fe=15.0. The compound was analyzed by nuclear magnetic resonance and infrared procedures which indicated the structure

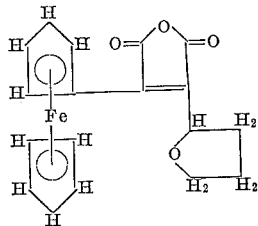

The novel compound is soluble in benzene, ether, ligroin, hexane, carbon disulfide, gasoline, dioxane, acetone, chloroform and the like.

*Example II*

The process described in Example I was repeated except that dioxane was substituted for tetrahydrofuran.

Analysis of the compound indicated the following structure:

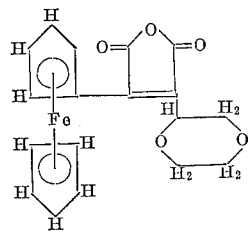

The compound had a melting point 152–154° C.

The novel compounds of this invention may be used in a variety of ways. Since the compounds are soluble in most of the common organic solvents and have been found to be very stable against decomposition when subjected to ultraviolet radiation they may be used as hydrocarbon inks due to the dark blue color characteristic. The novel compounds may also be used as combustion modifiers for a large number of organic compounds including gasoline, kerosene, fuel oil and particularly as antiknock and improving agents for motor fuels. The compounds may also be used as anti-corrosion agents and as pesticides and fungicides. Since the novel compounds possess a maleic anhydride moiety they are capable of undergoing the usual reactions thereof to form di-acids, acid-amides or half esters as well as being useful as monomers in polymerization reactions with many copolymerizable materials.

I claim as my invention:
1. A compound of the formula:

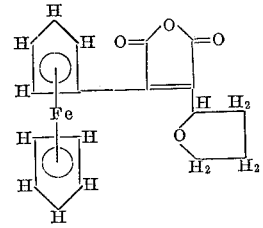

2. A compound of the formula:

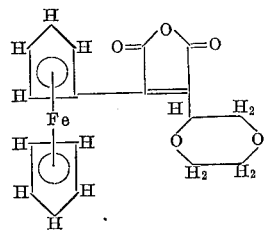

No references cited.

ALEX MAZEL, *Primary Examiner.*

JAMES H. TURNIPSEED, *Assistant Examiner.*